United States Patent
Roche et al.

(10) Patent No.: US 7,506,513 B2
(45) Date of Patent: Mar. 24, 2009

(54) DEVICE FOR FEEDING AIR AND FUEL TO A BURNER RING IN AN AFTER-BURNER CHAMBER

(75) Inventors: Jacques Roche, St. Sulpice les Feuilles (FR); Jacques Bunel, Fresnes (FR)

(73) Assignee: SNECMA, Paris (FR)

( * ) Notice: Subject to any disclaimer, the term of this patent is extended or adjusted under 35 U.S.C. 154(b) by 698 days.

(21) Appl. No.: 11/113,116

(22) Filed: Apr. 25, 2005

(65) Prior Publication Data
US 2005/0252216 A1    Nov. 17, 2005

(30) Foreign Application Priority Data
May 5, 2004   (FR) .................................. 04 04797

(51) Int. Cl.
*F02K 3/10* (2006.01)
(52) U.S. Cl. ............................ 60/761; 60/762; 60/765
(58) Field of Classification Search ................ 60/761, 60/762, 764, 766
See application file for complete search history.

(56) References Cited

U.S. PATENT DOCUMENTS

| | | | | |
|---|---|---|---|---|
| 3,269,116 A | * | 8/1966 | Frasca et al. ................ | 60/765 |
| 3,719,042 A | * | 3/1973 | Chamberlain ............... | 60/739 |
| 4,592,200 A | * | 6/1986 | Benoist et al. ............... | 60/763 |
| 4,899,539 A | * | 2/1990 | Gastebois et al. ............ | 60/762 |
| 5,212,945 A | | 5/1993 | Habrard | |
| 5,396,761 A | * | 3/1995 | Woltmann et al. ....... | 60/39.827 |
| 5,400,589 A | | 3/1995 | Mahias et al. | |
| 6,112,516 A | | 9/2000 | Beule et al. | |

FOREIGN PATENT DOCUMENTS

| | | |
|---|---|---|
| EP | 0 879 995 A1 | 11/1998 |
| FR | 1.321.385 | 3/1963 |
| FR | 2 709 342 | 3/1995 |

* cited by examiner

*Primary Examiner*—Michael Cuff
*Assistant Examiner*—Phutthiwat Wongwian
(74) *Attorney, Agent, or Firm*—Oblon, Spivak, McClelland, Maier & Neustadt, P.C.

(57) ABSTRACT

A device for feeding air and fuel to a burner ring in an after-burner chamber, including a plurality of flame-holder arms extending radially about the axis of the chamber from an outer casing, and a burner ring made up of ring sectors mounted substantially end to end on the flame-holder arms, the ring sectors containing fuel feed rail and air manifold boxes.

13 Claims, 5 Drawing Sheets

DEVICE FOR FEEDING AIR AND FUEL TO A BURNER RING IN AN AFTER-BURNER CHAMBER

The present invention relates to feeding air and fuel to a burner ring in an after-burner chamber, in particular in a bypass turbojet.

BACKGROUND OF THE INVENTION

In general, the after-burner systems of turbojets comprise a plurality of flame-holder arms extending radially relative to the axis of the turbojet from an outer casing of an after-burner chamber into the hot primary flow formed by the combustion gas, each flame-holder arm containing a fuel feed duct which extends radially inside the arm from the outer casing.

A burner ring is carried by the downstream portion of the flame-holder arms and extends either in the primary flow in the vicinity of the boundary between the primary flow and the cold secondary flow generated by the fan of the turbojet and flowing around the after-burner chamber, or else in the secondary flow itself. The ring may be made up of sectors whose facing ends are placed substantially end to end and are mounted on the flame-holder arms. These ring sectors are fed with fuel by ducts connected radially to the outer casing and they are also fed with air coming from the secondary flow.

When the burner ring extends in the portion of the after-burner chamber that conveys the primary flow, its air and fuel feed means need to pass through the secondary flow and also through a portion of the primary flow, and said means lead to relatively large head losses in these flows, thereby reducing the efficiency of the turbojet.

Since the temperature of the primary flow in the after-burner chamber can be as high as 2000° K. in after-burn mode, it is necessary to provide the means for feeding fuel to the after-burner with thermal protection, and such thermal protection is liable to further increase head losses in the primary and secondary flows.

OBJECTS AND SUMMARY OF THE INVENTION

A particular object of the invention is to provide a solution to these problems that is simple, inexpensive, and effective.

To this end, the invention provides a device for feeding air and fuel to a burner ring in an after-burner chamber of a bypass turbojet, the after-burner chamber containing a plurality of flame-holder arms extending radially about the axis of the chamber into the primary flow from an outer casing, a burner ring situated in the primary flow and made up of ring sectors mounted substantially end to end on the flame-holder arms, and means for feeding air and fuel to the burner ring sectors, wherein the means for feeding air and fuel to the burner ring sectors extend between the burner ring and the outer casing of the after-burner chamber inside the flame-holder arms and are connected to the burner ring sectors at the ends of said sectors.

The means for feeding air and fuel to the burner ring sectors are housed in the flame-holder arms and are thus thermally protected by the flame-holder arms. In addition, this disposition does not give rise to additional head losses in the primary and secondary flows and does not reduce the efficiency of the turbojet.

According to another characteristic of the invention, the means for feeding the ring sectors with air comprise manifold boxes formed or received in the ring sectors and fed with air via at least one of their ends opening out into the inside of a flame-holder arm whose radially-outer portion includes a capture opening for capturing a fraction of the secondary flow flowing in the outer casing.

Air thus flows inside each flame-holder arm from the capture opening of the arm at least into a manifold box of a ring sector carried by the arm.

Advantageously, the air manifold boxes have respective air inlet openings at each of their ends formed through their upstream walls, said air inlet openings opening out to the inside of a flame-holder arm.

According to another characteristic of the invention, each burner ring sector includes a fuel feed rail extending over substantially the entire length of the sector from one end thereof and connected at said end to a duct extending substantially radially inside the flame-holder arm to the outer casing.

Each ring sector is thus individually fed with fuel via a radial duct housed in the flame-holder arm, with the radial duct and the fuel feed duct of the flame-holder arm advantageously lying in a common plane containing the axis of the after-burner chamber in order to reduce head losses. By way of example, the duct for feeding the burner sector with fuel is located upstream from the feed duct of the flame-holder arm.

BRIEF DESCRIPTION OF THE DRAWINGS

Other advantages and characteristics of the invention appear on reading the following description made by way of non-limiting example and with reference to the accompanying drawings, in which.

MORE DETAILED DESCRIPTION

Figure 1:
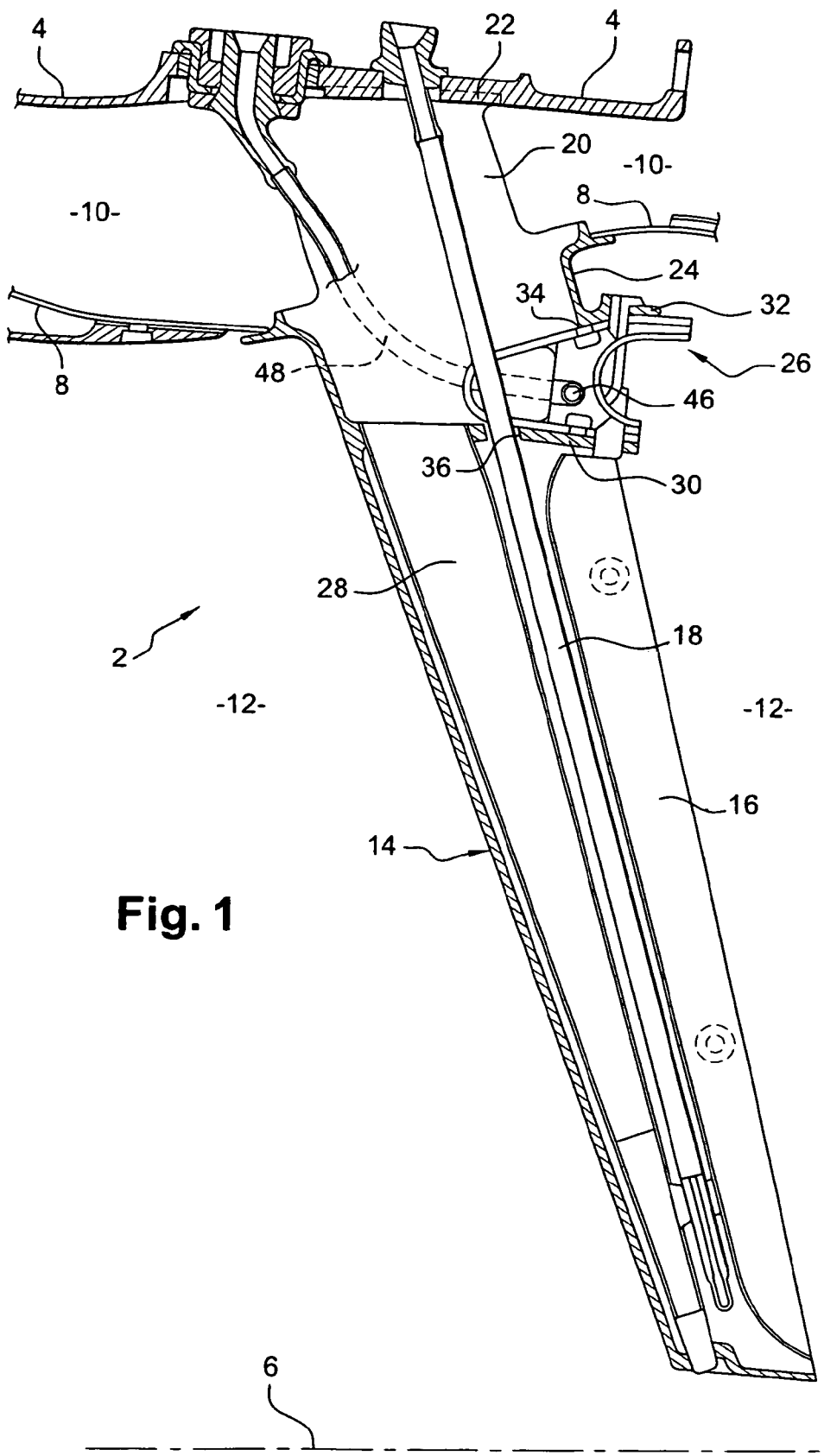
FIG. 1 is a diagrammatic fragmentary axial section view of a after-burner chamber of a bypass turbojet.

Reference is made initially to FIG. 1 which shows a portion of an after-burner chamber 2 of a bypass turbojet, the chamber being located downstream from the turbine of the turbojet.

The after-burner chamber 2 comprises a substantially cylindrical outer casing 4 of axis 6 and an inner cylindrical wall 8 coaxial with the outer casing 4, and co-operating therewith to define an annular space 10 extending from upstream to downstream, in which there flows the cold or secondary flow of the turbojet as generated by a fan at the upstream end of the turbojet and serving to increase thrust and to cool components of the turbojet.

The inner wall 8 defines an inner cylindrical space 12 extending from upstream to downstream in which there flows the hot or primary flow of the turbojet as constituted by the exhaust gas from the combustion chamber of the turbojet.

After-burning serves to increase the thrust of the turbojet and consists in injecting air and fuel into the primary flow and burning the mixture in the after-burner chamber 2.

This chamber 2 has some number of flame-holder arms 14 extending obliquely in planes containing the axis 6, with their radially-inner ends being offset downstream.

The flame-holder arms 14 are carried by the casing 4 and have respective radially-outer portions extending through the secondary flow, and radially-inner portions extending through the primary flow.

The radially-inner portion of each arm 14 is formed by a hollow V-section whose angle faces upstream and which is closed on the downstream side by a curved wall 16 forming a thermal protection screen for a fuel feed duct 18 extending along the arm 14 and having an outer end secured in an orifice of the outer casing 4 by suitable means.

In the radially-outer portion of the arm 14, the angle of the V-section is cut open to form an opening for capturing a fraction of the secondary flow. The two side walls 20 of this portion of the V-section are secured to the above-mentioned casing 4 via tabs 22 presenting orifices for passing nut-and-bolt type fastener means, or the like.

The annular space for passing the secondary flow is substantially halved in radial dimension downstream from the flame-holder arm 14 by an annular wall 24 mounted between the inner casing 8 and a burner ring 26 mounted in the primary flow on the downstream portions of the flame-holder arms 14, so that in operation a portion of the secondary flow penetrates into each arm 14 and flows into an air flow box 28 housed in the arm 14 and extending along the feed duct 18, upstream therefrom. The box 28 has holes distributed all along its length and opening out towards the feed duct 18, which itself has fuel spray holes facing downstream and formed through the wall of its radially-inner portion that extends in the primary flow.

Figure 2:
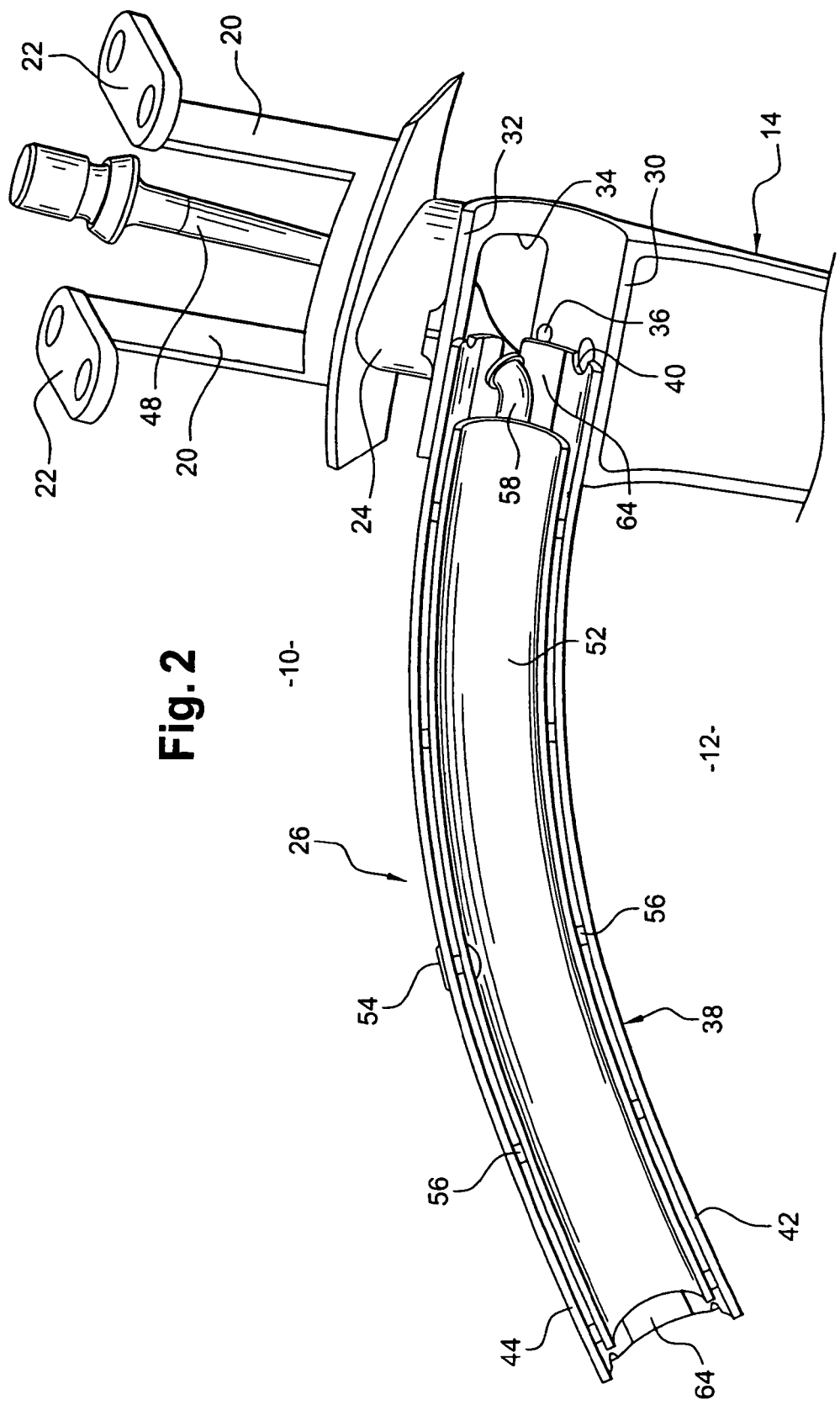
FIG. 2 is a diagrammatic fragmentary perspective view of a burner ring sector carried by a flame-holder arm.

Each flame-holder arm 14 has two substantially parallel plates 30 and 32 in the vicinity of its radially-outer portion, these plates being respectively a radially-inner plate and a radially-outer plate, both being oriented circumferentially and serving to support and guide the burner ring 26, the outer plate 32 having a substantially rectangular opening 34 on its upstream side opening out to the inside of the flame-holder arm 14 (FIG. 2).

These plates 30 and 32 are approximately rectangular in shape and extend axially downstream from the arm 14. The plates 30 and 32 have orifices for passing means for fastening the burner ring 26, the radially-inner plate 30 further comprising a substantially cylindrical orifice 36 for passing the feed duct 18 of the flame-holder arm 14.

The burner ring 26 is made up of annular sectors 38 disposed substantially end to end and each extending between two flame-holder arms 14.

The facing ends of the sectors 38 of the burner ring 26 are engaged between the above-mentioned plates 30 and 32 of the arms 14 and include substantially semicircular notches 40 in alignment with the above-mentioned orifices for passing the means for fastening the burner ring 26 to the plates 30, 32.

Reference is made below to FIGS. 2 to 6.

Each ring sector 38 is of generally U-shaped section with a rounded web and two flanges 42 and 44 respectively constituting a radially-inner flange and a radially-outer flange that are interconnected at their upstream ends by the rounded web, with the inner flange 42 being substantially cylindrical and centered on the axis 6 of the after-burner chamber 2 and with the outer flange 44 being slightly curved in axial section and extending obliquely outwards on going downstream.

Each ring sector 38 has fuel feed means in the form of a circular arcuate rail 46 extending circumferentially within the ring sector 38 and a duct 48 extending between one end of the rail 46 and connection means mounted in an orifice of the outer casing 4, this duct 48 passing through the openings 34 of the plate 32 and extending substantially radially between the side walls 20 of the outer portion of the arm 14.

The rail 46 has fuel spray holes that face downstream and it is carried within the ring sector 38 by two radial elements 49 extending between the flanges 42 and 44 of the sector 38 and bearing against the inside surfaces of the flanges 42 and 44, these elements 49 being held to the flanges 42 and 44 by suitable means 50 such as pegs carried by the elements 49 and engaged in holes in the flanges 42 and 44.

Figure 3:
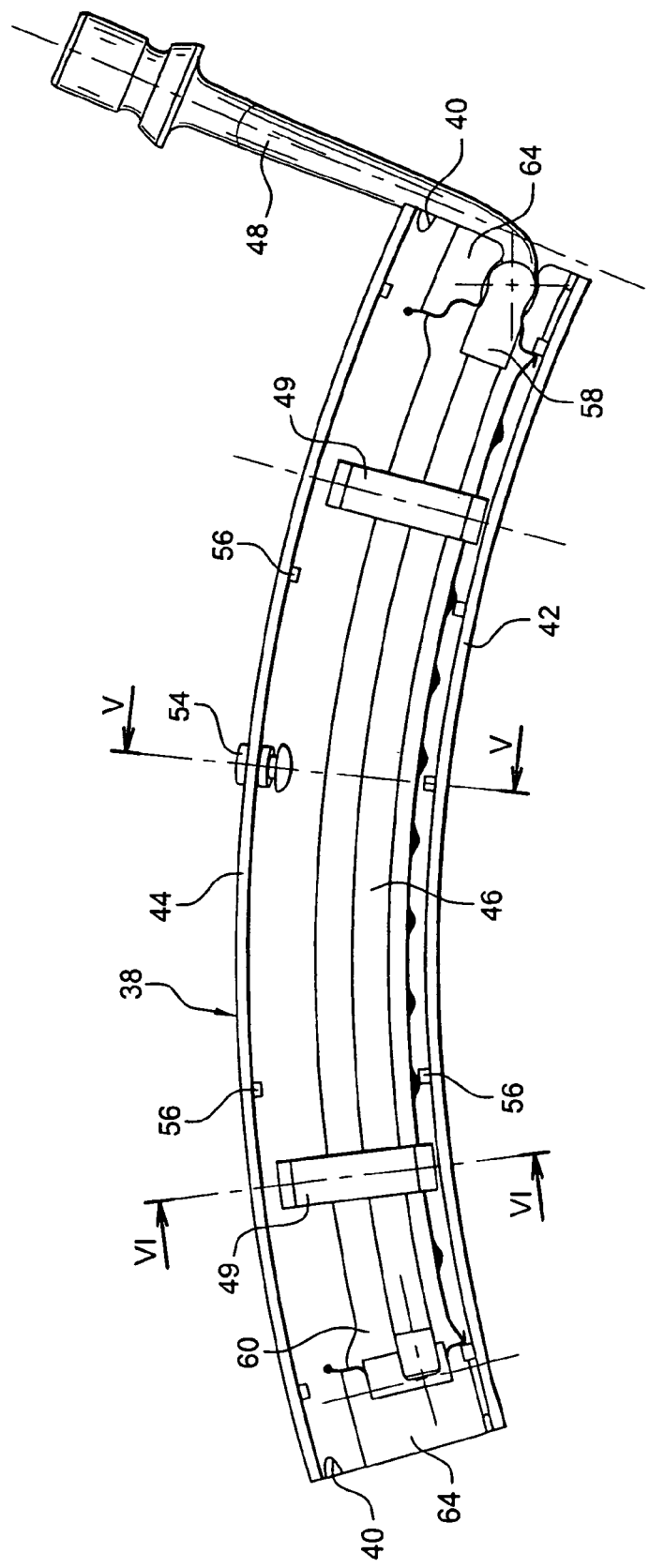
FIG. 3 is a diagrammatic face view seen from the downstream end of a fuel feed rail of a burner ring sector of the invention.
Figure 4:
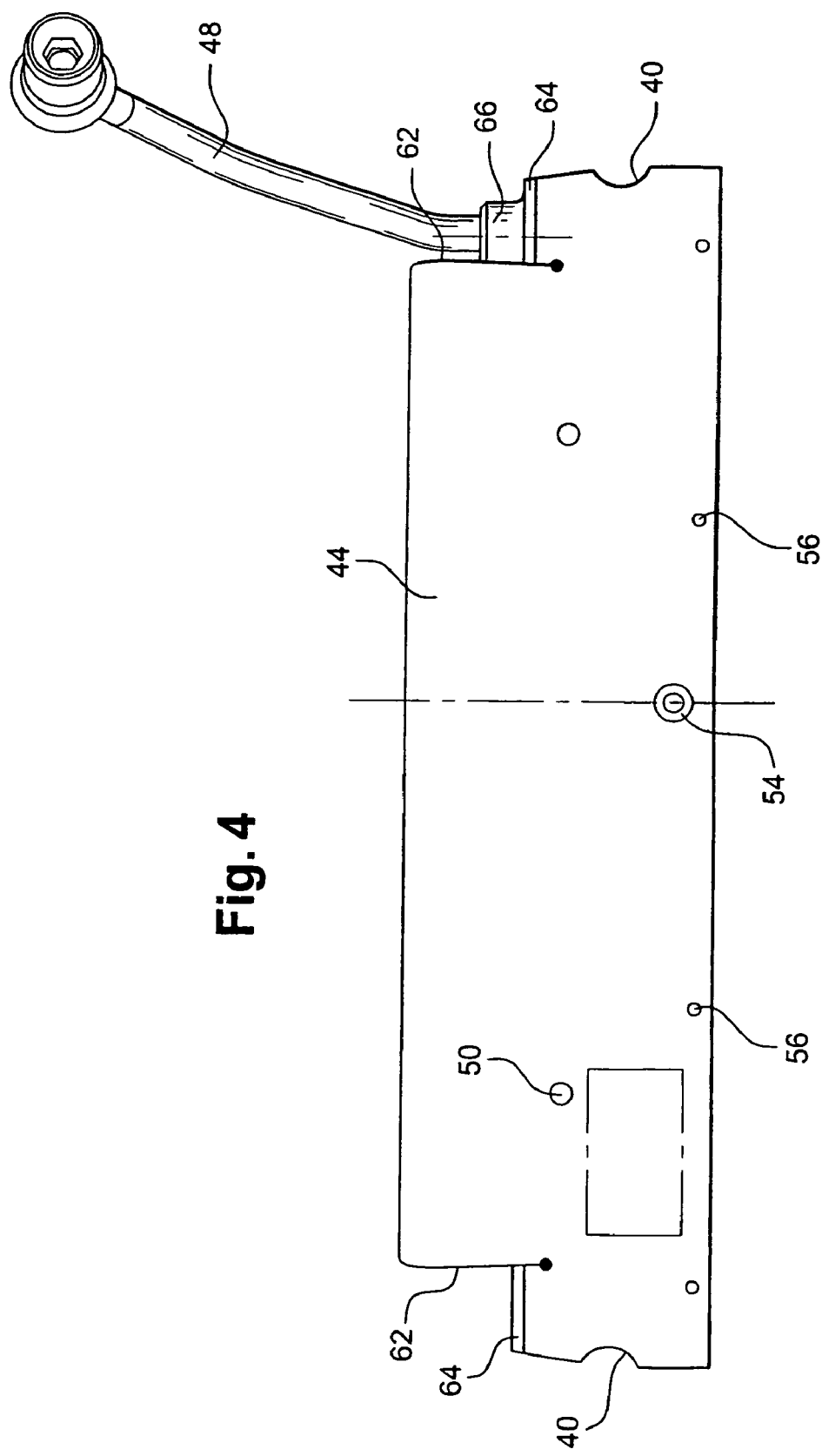
FIG. 4 is a diagrammatic plan view of the FIG. 3 burner ring sector.
Figure 5:
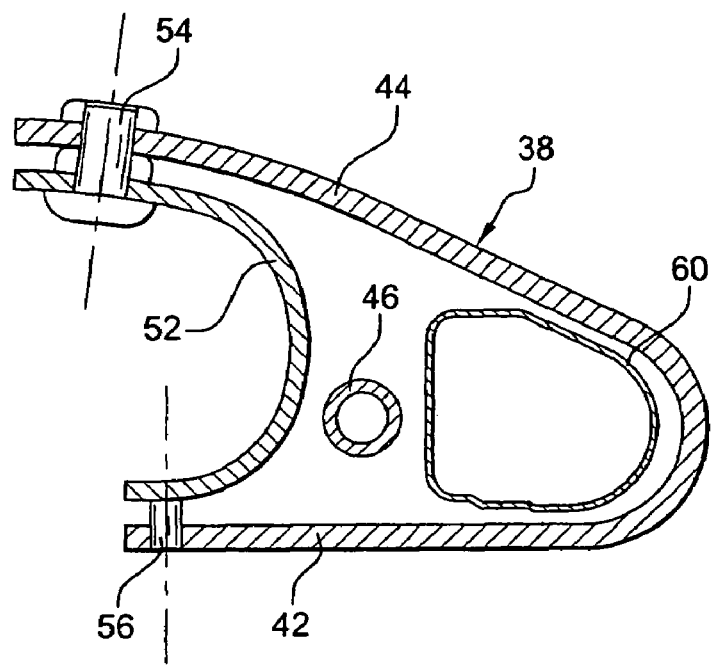
FIG. 5 is a section view on line V-V of FIG. 3.
Figure 6:
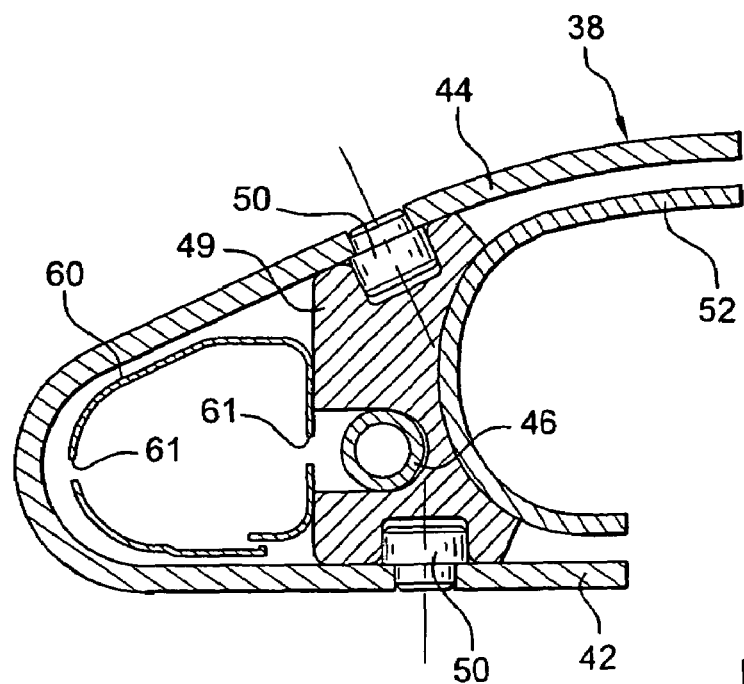
FIG. 6 is a section view on line VI-VI of FIG. 3.

The upstream edges of the elements 49 include U-shaped cutouts in which the rail 46 is engaged, which rail is thermally protected on its downstream side by a curved wall 52 received between the downstream ends of the flanges 42 and 44 of the sector 38 of the burner ring 26, and bears against concave downstream edges of the elements 49, the curved wall 52 being omitted from FIG. 3 for greater clarity.

The curved wall 52 extends over nearly the entire length of the ring sector 38 and is fastened thereto by suitable means such as rivets 54, the radially-inner and outer ends of the wall 52 being spaced apart from the inside surfaces of the flanges 42 and 44 by means of studs 56 regularly spaced over these surfaces in order to define annular slots for injecting air and fuel into the primary flow.

The end of the rail 46 remote from the duct 48 is closed, and the connection between the rail 46 and the duct 48 is made by means of a bend 58.

Each ring sector 38 contains an air manifold box 60 extending along the feed rail 46 of the sector 38, upstream therefrom, and bearing against the radial elements 49. Over its entire length, the box 60 presents holes 61 opening out downstream towards the feed rail 46 and upstream towards the web of the ring sector 38.

A cutout 62 is formed at each end of each ring sector 38 in the flanges 42 and 44 where they join on the upstream side, the cutouts 62 of the facing ends of the two ring sectors 38 carried by a given arm 14 being substantially in alignment with the opening 34 of the plate 32 of the arm 14 so as to pass a fraction of the secondary flow into the manifold boxes 60.

Each cutout 62 is closed downstream by a transverse wall 64 forming a portion of the air manifold box 60 of the ring sector 38 or which is mounted in the ring sector 38 in line with the downstream wall of the manifold box 60.

One of the two transverse walls 64 of the ring sector 38 includes an orifice for passing the bend 58 connecting the duct 48 to the rail 46, the bend 58 being held in said orifice by means of a bushing 66.

In operation, a portion of the secondary flow that penetrates into the flame-holder arms 14 passes through the above-mentioned opening 34 in the plate 32 and passes through the cutouts 62 in the facing ends of the two ring sectors 38 mounted on the arm 14, and then flows within the manifold boxes 60 of these two ring sectors 38, and passes via the holes in the boxes towards the feed rail 46. The mixture comprising this air and fuel sprayed out by the rail 46 is injected into the primary flow in order to be burnt therein.

In after-burn mode, the temperature of the secondary flow 12 is about 450° K., for example, while that of the primary flow 14 reaches 2000° K. The flow of air in the ring sector 38 enables the means for feeding air and fuel to the ring sectors 38 to be cooled, since they are no longer exposed directly to the primary flow. The device of the invention makes it possible to increase the efficiency of the turbojet by limiting head losses in the primary flow and by improving the conditions under which fuel is injected into the primary flow via the burner ring.

By way of example, the after-burner chamber may have nine flame-holder arms 14 regularly spaced apart from one another and disposed around the axis 6 of the turbojet at intervals of about 40°, with nine burner ring sectors 38 being disposed therebetween.

What is claimed is:

1. A device for feeding air and fuel to a burner ring in an after-burner chamber of a bypass turbojet, the after-burner chamber containing a plurality of flame-holder arms extending radially about the axis of the chamber into the primary flow from an outer casing, a burner ring situated in the primary flow and made up of ring sectors which are mounted substantially end to end on the flame-holder arms, wherein said burner ring contains fuel feed rails and manifold boxes, and means for feeding air to the manifold boxes and fuel to the fuel rails, wherein the means for feeding air and fuel extend between the burner ring and the outer casing of the after-burner chamber inside the flame-holder arms and are connected to the manifold boxes and the fuel feed rail via the ends of said ring sectors.

2. A device according to claim 1, wherein the manifold boxes are fed with air via at least one of their ends opening out into the inside of a flame-holder arm whose radially-outer portion includes a capture opening for capturing a fraction of the secondary flow flowing in the outer casing.

3. A device according to claim 2, wherein the air manifold boxes have respective air inlet openings at each of their ends formed by cutouts in the ends of the burner ring sectors.

4. A device according to claim 1, wherein each burner ring sector includes a fuel feed rail extending over substantially the entire length of the sector from one end thereof and connected at said end to a duct extending substantially radially inside the flame-holder arm to the outer casing.

5. A device according to claim 4, wherein the rail is carried by radial elements mounted in the burner ring sector and having an air manifold box bearing thereagainst on the upstream side, and, on the downstream side, a wall for thermally protecting the rail.

6. A device according to claim 4, wherein the above-mentioned duct and the rail for feeding the flame-holder arm with fuel lies substantially in a common plane containing the axis of the after-burner chamber.

7. A device according to claim 6, wherein the above-mentioned duct is upstream from the feed duct of the flame-holder arm.

8. A device according to claim 4, wherein the above-mentioned radial duct is connected to the feed rail of the burner ring sector via a bend secured in an orifice of a transverse end wall of the burner ring sector, said wall defining an air inlet opening facing downstream through the burner ring sector.

9. A device according to claim 1, having nine ring sectors and nine flame-holder arms, the arms being angularly spaced apart from one another by about 40°.

10. A device according to claim 1, wherein each burner ring sector includes a manifold box and a feed rail that extends circumferentially within said burner ring sector, said manifold box extending along said feed rail.

11. A device according to claim 10, wherein the manifold box in each burner ring sector is placed upstream of the feel rail and defines downstream openings facing said feed rail.

12. A device according to claim 11, wherein each manifold box defines upstream openings facing a web of the burner ring sector.

13. A device according to claim 10, wherein each burner ring sector includes a duct that feeds fuel into said feed rail, said duct extending from said burner ring sector to said outer casing.

* * * * *